United States Patent [19]
Conley et al.

[11] Patent Number: 5,892,161
[45] Date of Patent: Apr. 6, 1999

[54] TRANSDUCER ASSEMBLY FOR AN ELECTRONICALLY MONITORED MECHANICAL PIPETTE

[75] Inventors: Paul G. Conley; Jeff Merwin, both of St.Charles, Mo.

[73] Assignee: Tyco Group S.a.r.l., Luxembourg

[21] Appl. No.: 925,980

[22] Filed: Sep. 9, 1997

[51] Int. Cl.⁶ ........................................... B01L 3/02
[52] U.S. Cl. ............................................ 73/864.18
[58] Field of Search .................. 73/864.18; 422/100; 141/25, 27; 222/287, 309, 391

[56] References Cited

U.S. PATENT DOCUMENTS

| | | | |
|---|---|---|---|
| 3,933,048 | 1/1976 | Scordato | 73/425.6 |
| 4,009,611 | 3/1977 | Koffer et al. | 73/425.6 |
| 4,054,062 | 10/1977 | Branham | 73/425.6 |
| 4,096,750 | 6/1978 | Sturm | 73/425.4 |
| 4,096,751 | 6/1978 | Withers et al. | 73/425.6 |
| 4,099,548 | 7/1978 | Sturm et al. | 141/27 |
| 4,327,595 | 5/1982 | Schultz | 73/864.12 |
| 4,418,580 | 12/1983 | Satchell et al. | 73/864.13 |
| 4,442,722 | 4/1984 | Meyer | 73/864.18 |
| 4,567,780 | 2/1986 | Oppenlander et al. | 73/864.16 |
| 4,671,123 | 6/1987 | Magnussen, Jr. et al. | 73/864.16 |
| 4,757,437 | 7/1988 | Nishimura | 364/167 |
| 4,779,467 | 10/1988 | Rainin et al. | 73/864.17 |
| 4,821,586 | 4/1989 | Scordato et al. | 73/864.18 |
| 4,905,526 | 3/1990 | Magnussen, Jr. et al. | 73/864.18 |
| 5,002,737 | 3/1991 | Tervamaki | 422/100 |
| 5,021,217 | 6/1991 | Oshikubo | 422/100 |
| 5,187,990 | 2/1993 | Magnussen, Jr. et al. | 73/864.18 |

*Primary Examiner*—Robert Raevis
*Attorney, Agent, or Firm*—David Warmbold, Esq.

[57] ABSTRACT

The present invention relates to an electronically monitored mechanical pipette which includes a transducer assembly for monitoring the rotational movement of a volume delivery adjustment mechanism of the pipette. The transducer assembly preferably includes at least two Hall-effect transducers spaced 90 rotational degrees apart from each other and sense the magnetic field of an annular magnet attached to the delivery adjustment mechanism. The Hall-effect sensors produce sinusoidal signals which are 90° out of phase from each other when the magnet rotates relative thereto. The two out of phase sinusoidal signals are processed by an electronics assembly of the pipette to determine the absolute position of the volume delivery adjustment mechanism and compute a fluid volume delivery setting of the pipette. The transducer assembly in conjunction with the electronics assembly monitors both the number of revolutions of the volume delivery adjustment mechanism from an initial zero position, but also the position of the volume delivery adjustment mechanism within a revolution.

6 Claims, 9 Drawing Sheets

TRANSDUCER ASSEMBLY FOR AN ELECTRONICALLY MONITORED MECHANICAL PIPETTE

BACKGROUND OF THE INVENTION

1. Field of the Invention

The invention relates generally to an electronically monitored mechanical pipette. More specifically, the invention relates to a transducer assembly for monitoring the position of a volume delivery adjustment mechanism of the pipette, and for signalling the electronic system of the pipette of the changing volume delivery setting.

2. Prior Art

Mechanically operated micropipettes are well known in the art as exemplified by U.S. Pat. No. 4,909,991 to Oshikubo. In such prior art devices, the volume of liquid to be dispensed by the pipette is generally indicated to the operator by means of a mechanical display. The display commonly consists of a set of rotary drums driven by a gear mechanism attached to the actuating shaft of the pipette, such that rotation of the actuating shaft causes the drums to rotate to display a new setting. However, due to unavoidable mechanical wear and tear on pipettes, the amount of fluid actually being delivered by a pipette may not actually correspond to the volume being indicated by the mechanical display. Further, accuracy may degrade over time as the actuating elements, such as the shaft, gears, and rotary drum, wear out.

Electrically driven pipettes are also well known in the art as exemplified by U.S. Pat. No. 4,905,526 to Magnussen, Jr. et al. This type of instrument commonly includes an electronic display for displaying the volume of fluid to be dispensed by the pipette, and an actuator generally comprising an electric drive mechanism, such as a stepper motor. The stepper motor generally drives a rotor, which is attached by a threaded screw to an actuator shaft, the threaded screw changes the rotational motion of the motor into linear motion of the actuator shaft. The shaft thereafter drives a piston to displace fluid for pipetting. Although electrically operated pipettes have some advantages over mechanically operated pipettes, they nevertheless suffer from several drawbacks. Mainly, the enlarged size of an electrically operated pipette, due to the need to accommodate the electric driving mechanism, and the added electronic hardware, make the device very difficult to handle for the operator. Further, monitoring the position of the electric motor for purposes of ensuring desired fluid delivery volume can lead to less than desired delivery accuracy.

Electrically monitored mechanical pipettes are also known in the art as exemplified by U.S. Pat. No. 4,567,780 to Oppenlander et al. This type of instrument generally includes a plunger having an adjustable stroke length which is generally adjusted by rotating the plunger itself. The electrical monitoring system monitors plunger rotation and electronically displays the volume delivery setting corresponding to the plunger position. The device continuously monitors the plunger position and volume delivery setting of the pipette by means of a potentiometer. Although this device overcomes several of the disadvantages of mechanical and electrical pipettes, it nevertheless fails to completely resolve the problem of high power demands during operation. Further, the use of a potentiometer to monitor the position of the plunger is sometimes not desirable.

Electrically driven pipettes which include a transducer assembly are also well known in the art as exemplified by U.S. Pat. No. 4,821,586 to Scordato et al. This instrument uses a Hall-effect transducer to indicate when the volume delivery adjustment mechanism thereof is in its "home" position, and therefore ready to be set to a desired volume delivery setting. However, the volume delivery setting is calculated based on the number of pulses applied to the windings of an actuation motor, which in turn determines the number of steps a threaded element rotates through a set of threads of known pitch. This indicates the distance the plunger moves longitudinally from the "home" position, thus determining the stroke of the piston and the volume of fluid which will be aspirated into the tip of the pipette. Although the electrically driven pipette uses a Hall-effect switch to assist in positioning the volume delivery adjustment mechanism, it nevertheless suffers from several drawbacks. Mainly, the Hall-effect transducer is used only as a "switch" to indicate a "home" position from which a volume delivery setting can be made, instead of directly monitoring the entire range of movement of the volume delivery adjustment mechanism and thereby directly indicating all positions of the mechanism to the electronic assembly of the unit. Therefore, fluid delivery setting cannot be determined directly from the output of the Hall-effect transducer.

OBJECTS AND SUMMARY OF THE INVENTION

The principal of object of the present invention is to provide an electronically monitored mechanical pipette which includes a transducer assembly as part of an electronic volume monitoring system for monitoring the position of volume delivery adjustment mechanism of the pipette.

Another principal object of the present invention is to provide an electronically monitored mechanical pipette as described above in which the transducer assembly tracks the movement of the volume delivery adjustment mechanism such that the electronic monitoring system can recompute a new fluid volume delivery setting based directly on the output signals of the transducer assembly.

A further object of the present invention is to provide an electronically monitored mechanical pipette as described above in which the transducer assembly uses an annular shaped bar magnet which rotates adjacent to a plurality of magnetic field sensors to generate the signals which are sent to the electrical assembly of the electrical volume monitoring system for its use in computing the fluid volume delivery setting of the pipette.

A further object of the present invention is to provide an electronically monitored mechanical pipette as described above in which the transducer assembly of the electrical volume monitoring system is capable of recognizing the direction of movement of the fluid delivery setting mechanism of the pipette and the electrical assembly of the electrical volume monitoring system can precisely calculate the fluid volume delivery setting to be delivered by the pipette at any time.

Briefly, and in general terms, the present invention provides for electronically monitoring a mechanical pipette with an electronic volume monitoring system which includes a transducer assembly and an electronics assembly which allow monitoring and position indication of the volume delivery adjustment mechanism of the pipette directly by the transducer assembly.

In the presently preferred embodiment, shown by way of example and not necessarily by way of limitation, an electrically monitored mechanical pipette made in accordance with the principles of the present invention includes a volume delivery adjustment mechanism which includes a plunger, a threaded advancer, a driver, and a threaded bushing. The volume delivery adjusted mechanism is monitored by an electrical volume monitoring system which preferably includes a transducer assembly having two Hall-effect sensors, and an electronics assembly which includes a microprocessor and a display. During volume delivery adjustment, the sensors send a set of transducer signals to the electronics assembly which uses the signals to compute and display the new fluid volume delivery setting.

A microswitch assembly is provided for detecting relative rotational motion between the volume delivery adjustment mechanism and the pipette and to signal the electronics assembly that the fluid volume delivery setting is being changed. Upon receipt of a signal, such as an interrupt signal, from the microswitch, the electronics assembly powers up the transducer assembly which then tracks the motion of the volume delivery adjustment mechanism. The transducer sensor signals are received by the electronics assembly which computes and displays the new fluid volume delivery setting based on the number of complete revolutions of the volume delivery adjustment mechanism and the exact position thereof in its last (partial) revolution. Once the volume delivery adjustment mechanism is no longer being rotated, the electronics assembly shuts down the power to the transducer assembly to minimize power use of the pipette.

The transducer assembly is preferably a Hall-effect transducer which detects the magnitude of a magnetic field. In the preferred embodiment of the Hall-effect transducer, an annular magnet is positioned about a magnet bearing which will rotate with the rotating elements of the volume delivery adjustment mechanism, while the remainder of the transducer assembly remains stationary with respect to the pipette. As the annular magnet rotates, its magnetic field relative to any fixed point, varies sinusoidally. The transducer assembly preferably includes more than one sensor, each spaced 90° apart from each other within the rotating magnetic field. When two sensors are used, the output of the first sensor is 90° out of phase with the output of the second sensor. When the magnet rotates within the transducer assembly, the resulting sensor output is two sinusoidal signals, one signal being 90° out of phase from the other.

The sine-cosine combination of output signals from the two sensors allows the electronics assembly of the pipette to pin point the precise rotational position of the volume delivery adjustment mechanism and also the direction in which the volume delivery adjustment mechanism is being adjusted.

The annular magnet used in the transducer assembly of the present invention is manufactured to cause its north and south pole to be located at points on the circumference of the annular magnet, 180° apart from each other (diametrically), instead of being positioned on the top and bottom of the annular magnet. In this manner, rotation of the annular shaped magnet about its central axis causes the north and south poles thereof to alternatively move past the sensors as the volume delivery adjustment mechanism is rotated.

The electronics assembly of the pipette condition and process the signals received from the transducer assembly. Each transducer signal is fed into a microprocessor of the electronics assembly and the voltage thereof is measured. This input is used by the microprocessor as input data to an algorithmic computation of the present fluid volume delivery setting which is then displayed.

Alternatively, the microprocessor may be preprogrammed with a map of transducer output values which the microprocessor can match to the signals being received. Each set of values in the map corresponds to a particular fluid volume delivery setting which the microprocessor then causes to be displayed. A more detailed description of the operation of the electronics assembly of the present invention, including map generation, algorithmic computation, and calibration of the pipette, is included in the co-pending U.S. application Ser. No. 08/926,391 entitled "Calibration System for an Electrically Monitored Mechanical Pipette" filed 9 Sep. 1997, which is incorporated herein by reference in its entirety.

These and other objects and advantages of the present invention will become apparent from the following more detailed description, when taken in conjunction with the accompanying drawings in which like elements are identified with like numerals throughout.

DETAILED DESCRIPTION OF THE PREFERRED EMBODIMENT

Figure 1:
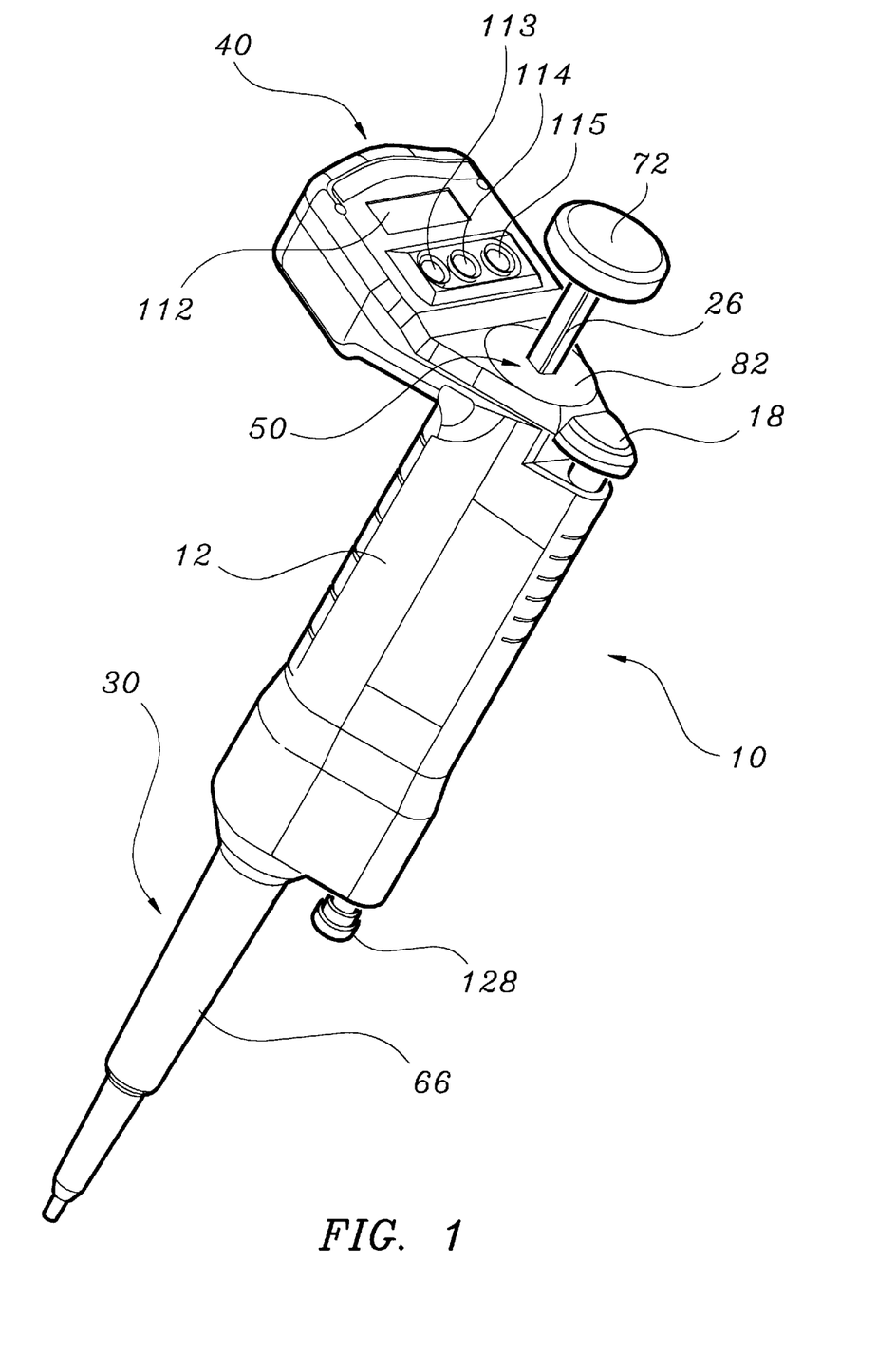
FIG. 1 is a perspective view of a pipette made in accordance with the principals of the present invention.
Figure 2:
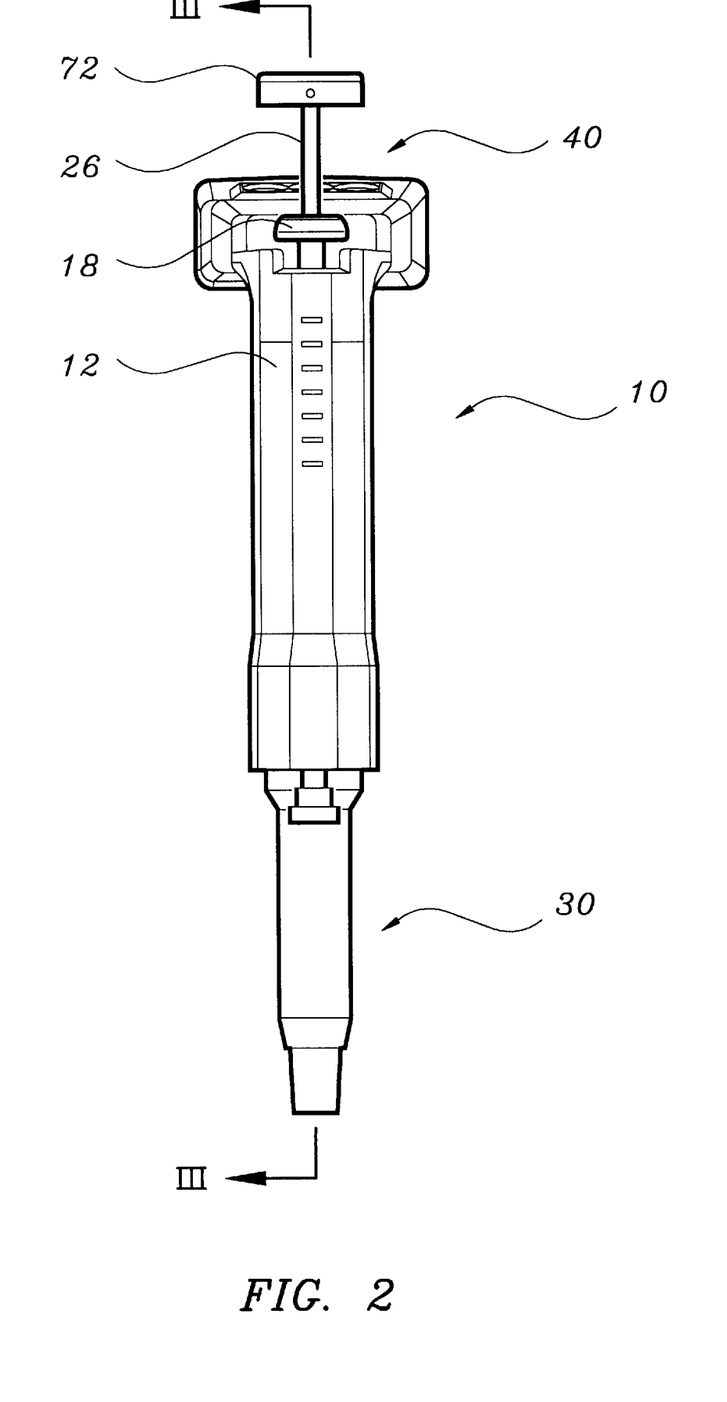
FIG. 2 is a front view of the pipette of FIG. 1.
Figure 3:
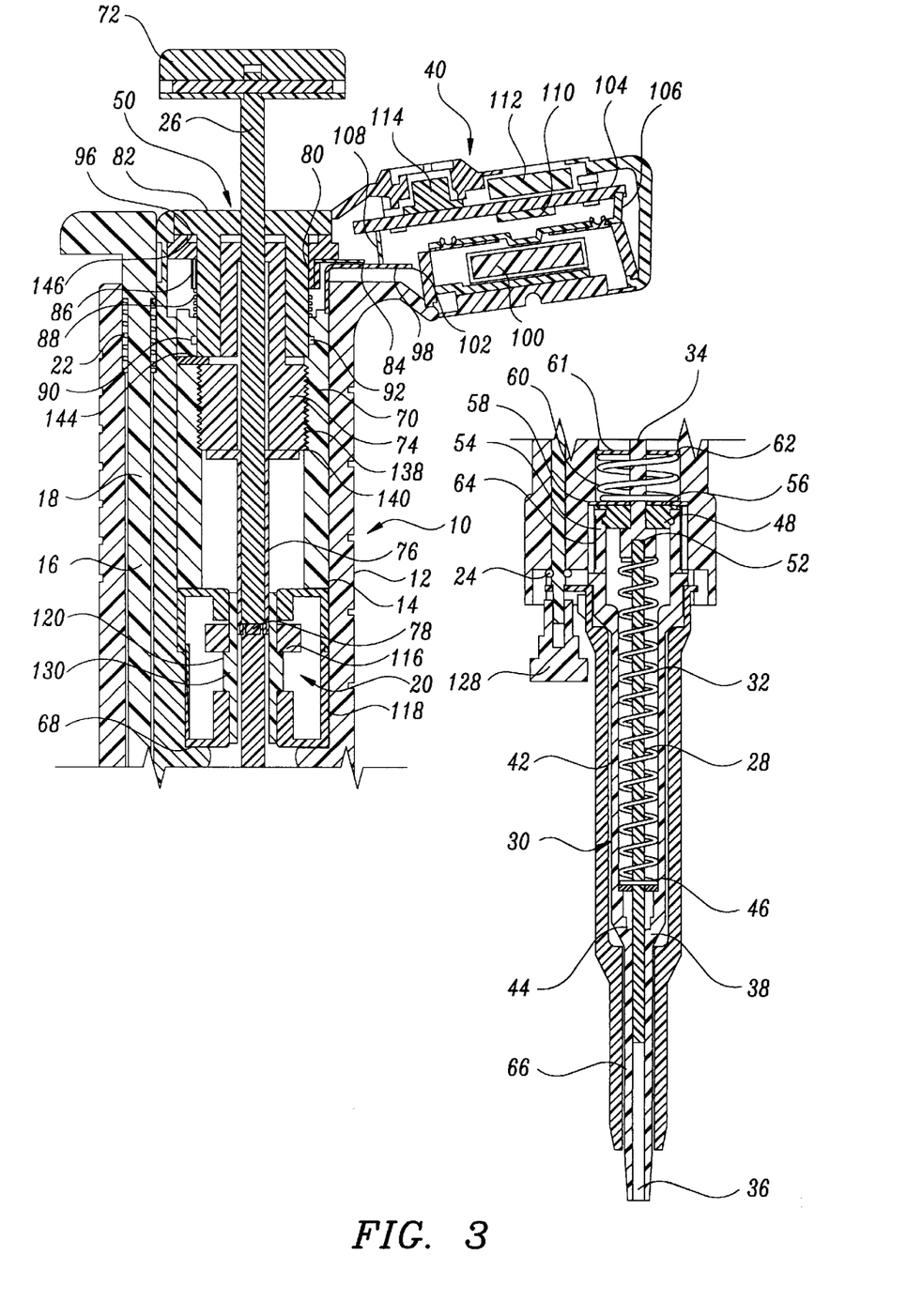
FIG. 3 is a cross-sectional view taken along line III—III of FIG. 2.
Figure 4:
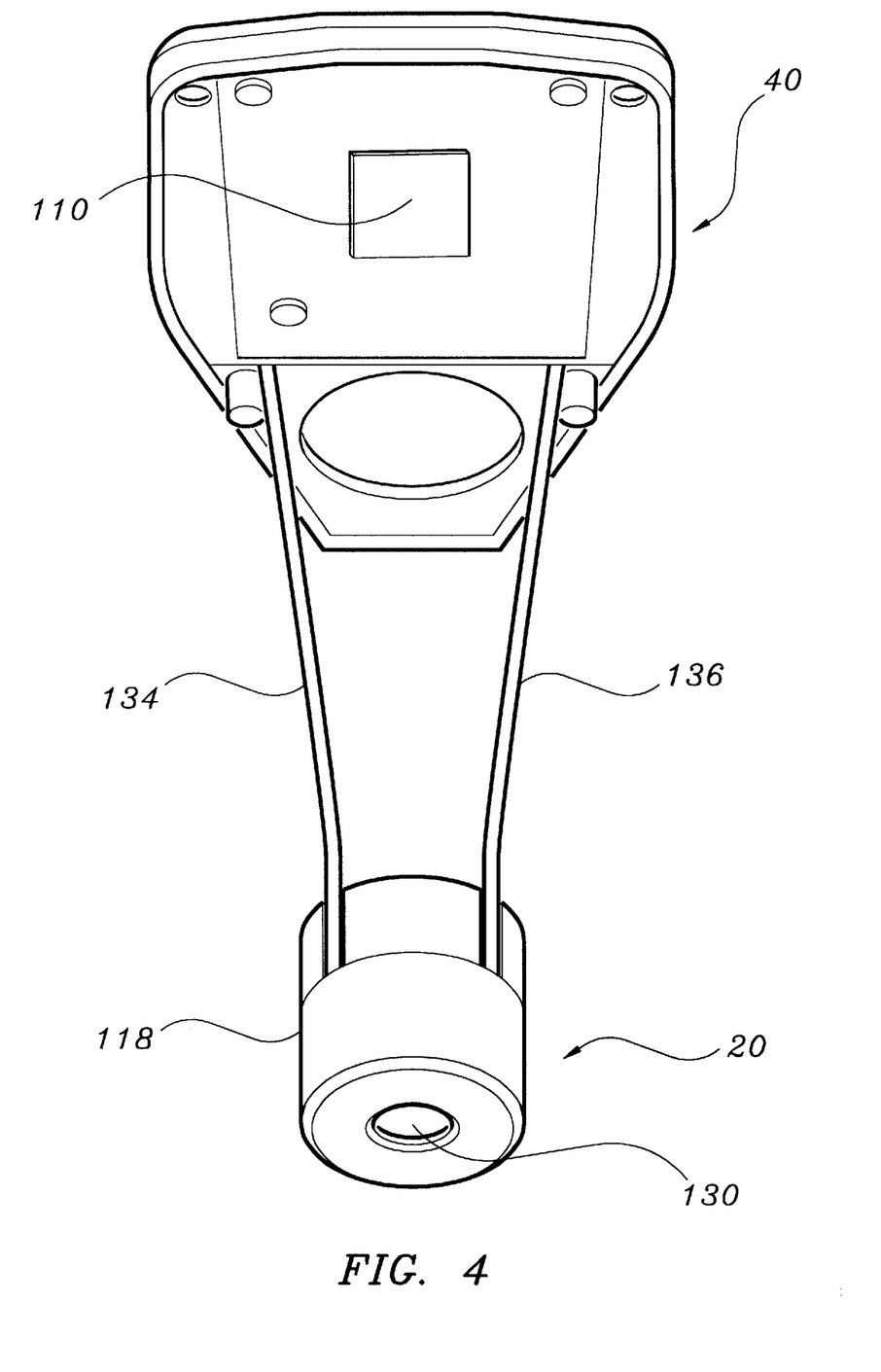
FIG. 4 is a perspective view of a preferred embodiment of an electronics assembly and a transducer assembly made in accordance with the principals of the present invention.
Figure 5:
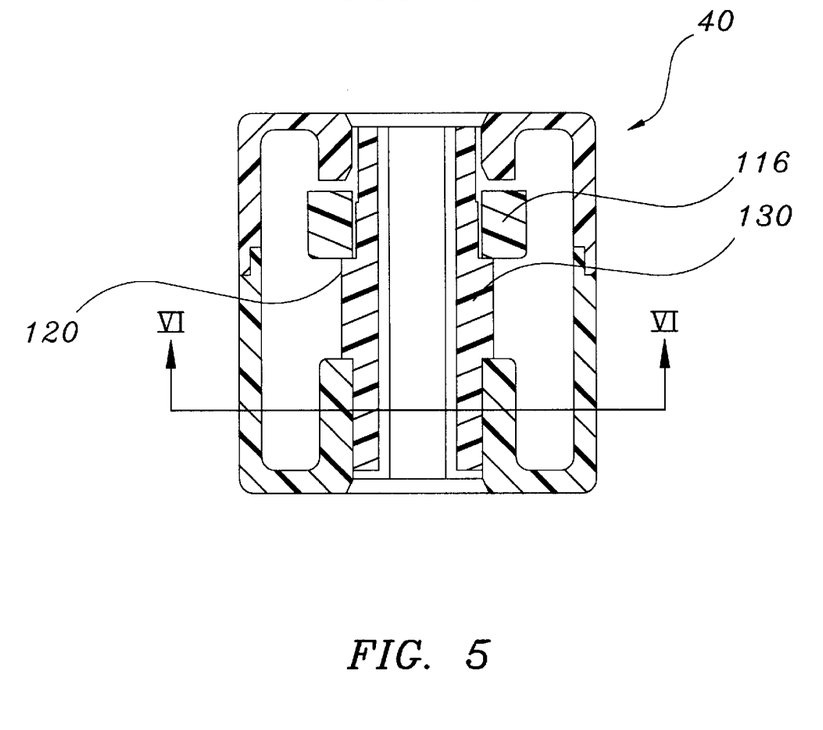
FIG. 5 is a view of a transducer assembly made in accordance with the principals of the present invention.
Figure 6:
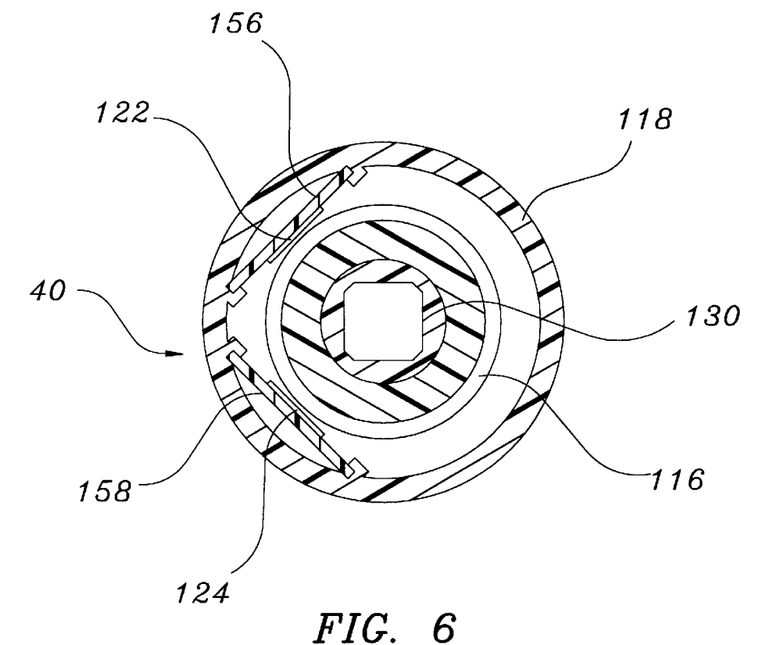
FIG. 6 is a cross-sectional view taken along line VI—VI of FIG. 5.

As shown in the exemplary drawings for the purposes of illustration, an embodiment of an electronically monitored mechanical pipette made in accordance with the principals of the present invention, referred to generally by the reference numeral 10, is provided with an electrical volume monitoring system having a transducer assembly for monitoring the position of the volume delivery adjustment mechanism thereof, and an electronic assembly for calculating and displaying the fluid volume delivery setting base on input received from the transducer assembly. More specifically, as shown in FIGS. 1–3, the pipette 10 of the present invention includes a housing 12 having a first generally cylindrical bore 14 passing longitudinally therethrough which contains a transducer assembly 20 centrally located therein, a microswitch assembly 50 positioned at the proximal end thereof and a barrel assembly 30 attached to the distal end thereof to extend outwardly in he distal longitudinal direction. The housing 12 also includes a smaller longitudinal bore 16 containing an ejector rod 18, held in its proximal most position by ejector spring 22 and prevented from escaping the smaller bore 16 by O-ring 24. An electronic assembly 40 is attached to the proximal end of the housing 12 and extends away from the housing 12 in a generally perpendicular direction. The housing 12 is designed to be easily gripped in a single hand of an operator such that the electronic assembly 40 remains above the operator's hand for easy viewing by the operator, and the barrel assembly 30 extends below the operator's hand for easy positioning thereof. The pipettor 10 can be operated by manipulation of the ejector rod 18 and the plunger 26 by the user's thumb as will be explained in more detail below.

Assembly

Referring again to FIGS. 1–3, assembly of the pipettor 10 of the present invention is preferably initiated with the barrel assembly 30. First, the piston 28 is inserted into the primary spring 32. The proximal end of the piston 28 is then affixed to the piston adaptor 34 and the distal end of piston 28 is inserted into the fluid channel 36 of the barrel housing 42. The fluid channel 36 is sealed against leakage therepast by means of a plug 38, preferably made of Teflon, through which the piston 28 passes and which seats itself in the distal portion of the barrel housing 42 just above the fluid channel 36. The plug 38 is secured for a fluid tight fit against the piston 28 by the seal 44. The seal 44 and plug 38 are held in the distal portion of the barrel housing 42 by washer 46 which is biased downward by the primary spring 32. The force of the washer 46 against the seal 44 assists the seal 44 in squeezing the plug 38 against the piston 28 and also assists in forcing the plug 38 downward against the proximal end of the fluid channel 36. This assists in preventing fluid leakage out of the fluid channel 36. Finally the annular disk 48 is inserted over the piston adaptor 34 and snap-fit into the distal opening of the barrel housing 42. The enlarged end 52 of the piston adaptor 34 is larger in diameter than the annular disk opening 54 and allows the piston adaptor 34 to move longitudinally relative to the barrel housing 42 yet does not allow it to be completely removed therefrom. This completes barrel assembly 30.

Turning now to the housing 12, the primary washer 61 is inserted into the distal end of the housing 12 until it abuts with the shoulder 62 thereof. The secondary spring 60 is then inserted into the distal end of the housing 12 until it abuts primary washer 61. The secondary washer 56 is then placed against the secondary spring 60 to abut with shoulder 58 of the housing 12. The primary washer 61, secondary spring 60 and secondary washer 56 are then permanently held in place within the housing 12 by press fitting the bushing barrel 64 into the distal end of the housing 12. The bushing barrel 64 is threaded on its interior surface and the proximal end of the barrel housing 42 of the barrel assembly 30 is threaded on its exterior surface. In this manner, the entire barrel assembly 30 can be removably attached to the housing 12 by threading the barrel housing 42 into the bushing barrel 64. A further description of the barrel assembly 30, including alternative embodiments thereof, is included in co-pending U.S. application Ser. No. 08/926,095 entitled "Detachable Pipette Barrel" filed Sep. 9, 1997, which is incorporated herein by reference in its entirety. Referring now to FIGS. 3–6, the transducer assembly 20 includes an annular magnet 116 encased in the transducer housing 118 and held in position on the transducer bearing 130 by abutment against shoulder 120. Sensors 122 and 124 are positioned within the transducer housing 118 at positions 90° apart from each other. The sensors 122 and 124 operate to track the rotation of the annular magnet 116. Leads 134 and 136 extend from the sensors 122 and 124 up to the electronics assembly 40 to allow the sensor signals to pass to the electronics assembly 40, as will be explained in more detail below.

As best seen in FIG. 3, the square plunger 26 is next inserted through the advancer 74. The transducer driver 76 is then inserted over the distal end of the plunger 26 and attached to the distal end of the advancer 74 by means of screws or the like. The distal end of the transducer driver 76 forms a reduced diameter threaded extension to which a small bushing 78 is threadedly attached. The small bushing 78 is of a larger diameter than the plunger 26 and thus interferes with the distal end of the transducer driver 76 to prevent the plunger 26 from being withdrawn therefrom.

Figure 7:
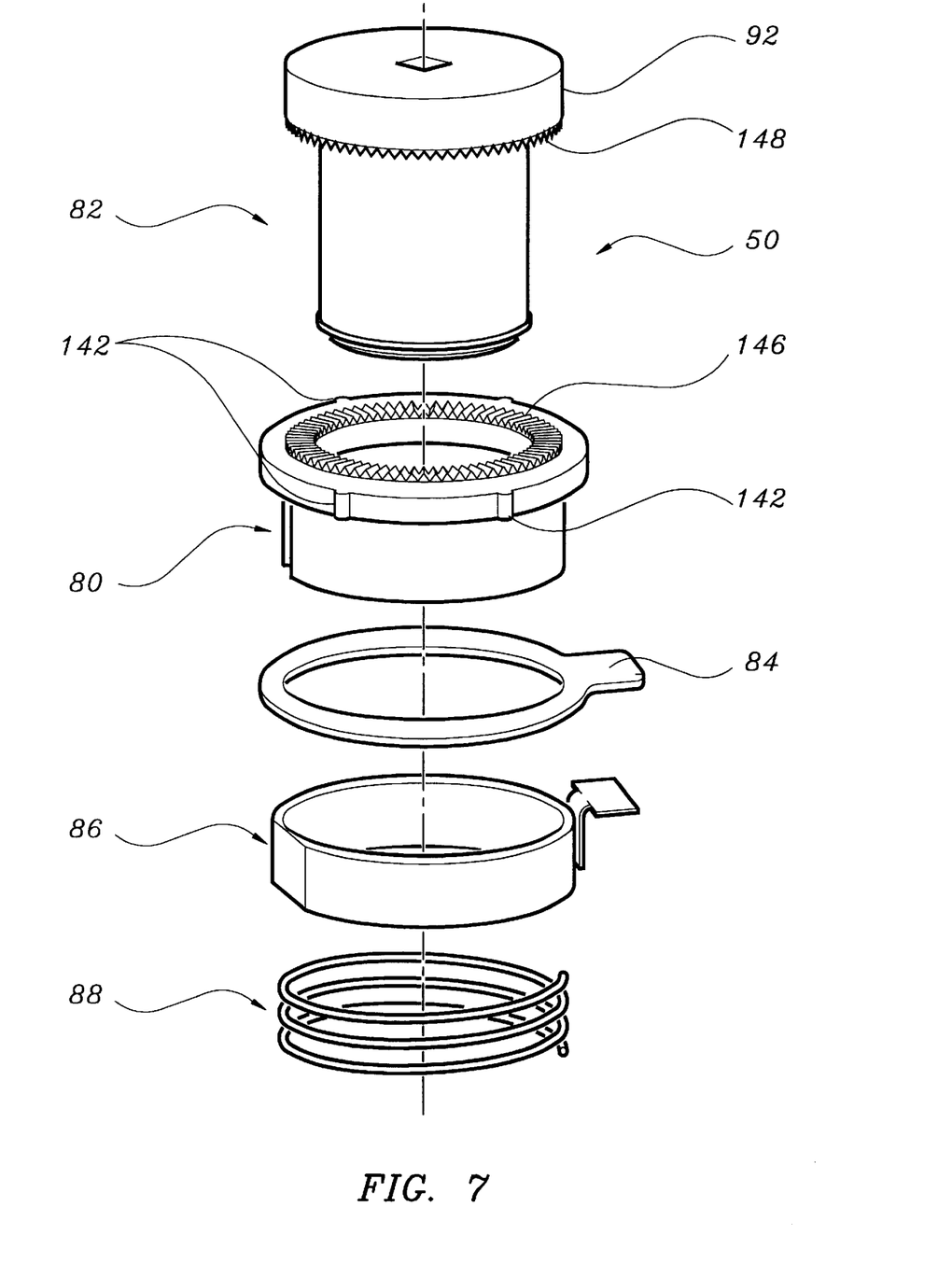
FIG. 7 is an exploded view of a preferred embodiment of a microswitch assembly made in accordance with the principals of the present invention.

Referring now to FIGS. 3 and 7, the microswitch assembly 50 is assembled by first sliding the square opening of the bobber guide 82 over the proximal end of the plunger 26, and attaching the button 72 to the proximal end of the plunger 26. Next, the bobber 80 is inserted over the bobber guide 82 and the bobber switch 84 is inserted over the bobber 80 and held in place by the retaining ring 86. The bobber spring 88 is then inserted over the bobber guide 82 until it abuts against the retaining ring 86 and the retainer 90 is attached to the distal end of the bobber guide 82. Threads 138 of the advancer 74 are then advanced into the threads 140 of bushing 70. The bobber guide 82 is then inserted into the bushing 70 until the retainer 90 snap fits into a retainer slot 92 in the interior annular surface of the bushing 70 just above threads 140. This action causes the bobber spring 88 to be biased between the retaining ring 86 and shoulder 94 in the proximal end of the bushing 70. In this manner, the bobber 80 is always biased upward against the enlarged flange portion 96 of the bobber guide 82. When completely assembled, the bobber 80 is prevented from rotating by the keys 142 thereon which match keyways (not shown) in bore 16. Similarly, pin 144 prevents the advancer 74 from rotating above the threaded portion of the bushing 70, and a key and keyway (not shown) are used to prevent rotation of the transducer housing 118. Thus, rotation of button 72 by the operator causes the plunger 26, advancer 74 and transducer driver 76 to rotate and translate in the upward or downward direction. Translational (longitudinal) distance is controlled by the pitch of threads 138 and 140, and the number of rotations of the button 72.

Likewise, rotation of button 72 causes rotation (but not translation) of bobber guide 82, transducer bearing 130 and annular magnet 116.

The rotational motion of the bobber guide 82 causes the bobber 80 to move downwardly. Since the bobber 80 is held against rotation by the keys 142 positioned in keyways (not shown) in the bore 16, the bobber 80 must move downwardly to unmesh bobber teeth 146 from bobber guide teeth 148. This downward motion causes the bobber switch 84 to contact the stationary switch pad 98, and continues until the bobber teeth 146 slip past the bobber guide teeth 148. This downward movement distance in the preferred embodiment is approximately 0.030 inches. The bobber 80 is then biased upwardly again by bobber spring 88. This continues as further rotation occurs, and results in a "bobbing" motion of bobber 80 until rotation of the button 72 is stopped.

Once the transducer assembly 20 and microswitch assembly 50 are completed, the transducer assembly 20 is inserted into the housing 12 through the proximal opening of bore 14 and held in position against shoulder 68 by bushing 70. The bushing 70 includes flattened surfaces (not shown) which form small longitudinal channels (not shown) in conjunction with the bore 14, through which the leads 134 and 136 pass from the transducer assembly 20 to the electronics assembly 40.

The stationary switch pad 98 is held in position at the top of the housing 12 by screws or the like, and a portion thereof extends into the bore 14 to contact and assist in retaining the bushing 70 in its proper position within the bore 14. The bobber switch 84 extends over and above the stationary switch pad 98 and is held in a spaced apart position therefrom by the bobber spring 88.

Figure 8:
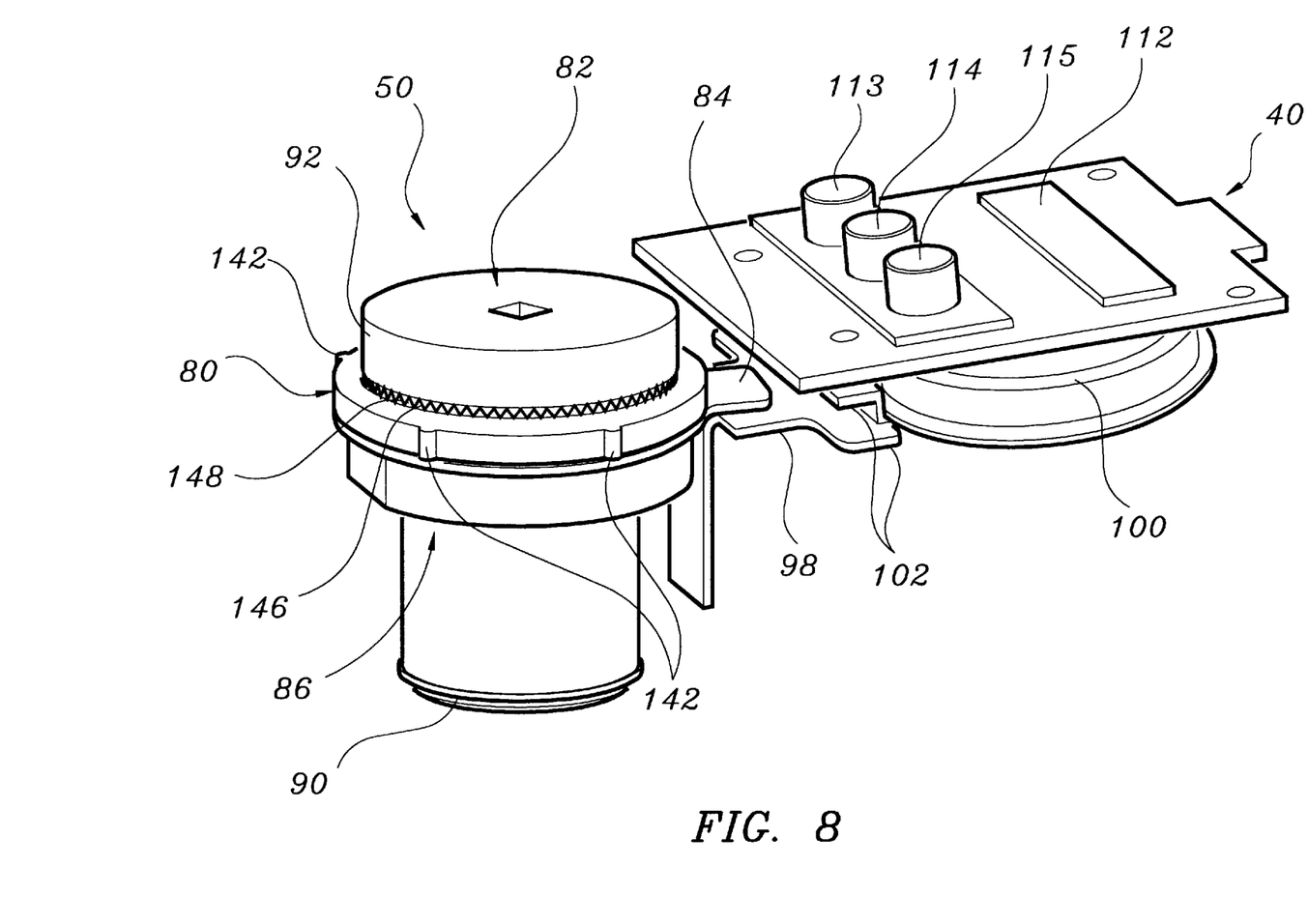
FIG. 8 is a perspective view of a preferred embodiment of a microswitch assembly and an electronics assembly made in accordance with the principals of the present invention with the housing of the electronics assembly removed.
Figure 9:
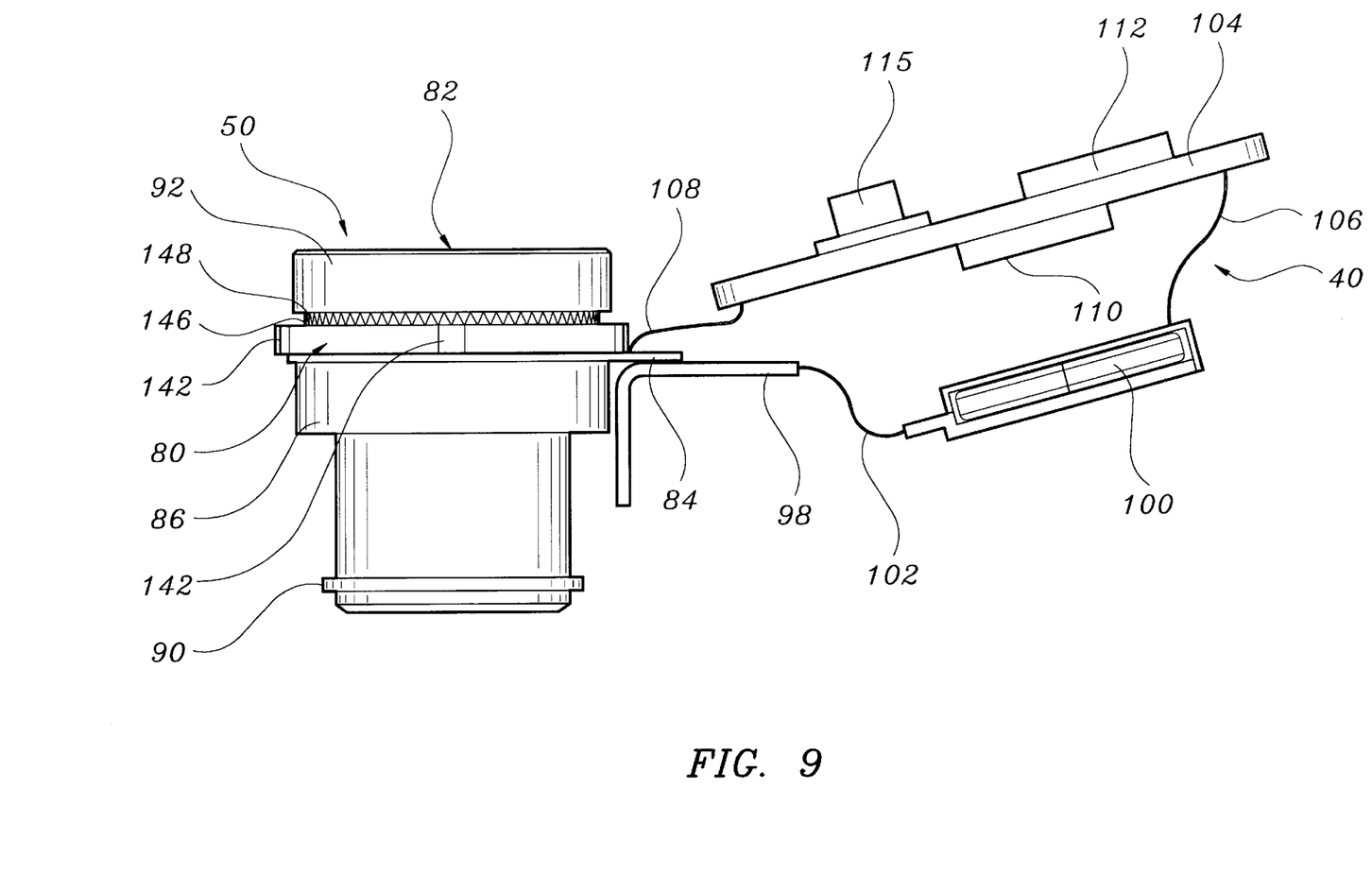
FIG. 9 is a side view of the microswitch assembly and electronics assembly of FIG. 8.

As shown in FIGS. 8 and 9, the stationary switch pad 98 is in electrical contact with the electronic assembly 40 and likewise forms part of the electrical volume monitoring system by being attached to the negative side of the batteries 100 through lead 102 and to the positive side of the circuit board 104 by lead 106. The circuit board itself is connected to the positive side of the batteries 100 by lead 108. The circuit board 104 has attached thereto the microprocessor 110, the LCD display 112, the calibration buttons 113, 114, 115 and the leads 134 and 136 from the transducer assembly 20.

Finally, referring now to FIG. 3, the ejector spring 22 is inserted over the ejector rod 18 and the ejector rod 18 is subsequently inserted through the small bore 16 of the housing 12. The O-ring 24 is attached to a distal portion of the rod 18 to retain it within the small bore 16. The distal end of ejector rod 18 is threaded and sized to receive the ejector barrel 66 which is held in place by nut 128.

In use, a disposable pipette tip (not shown) is attached to the distal end of the barrel housing 42 to be in fluid flow communication with the fluid channel 36 and to abut the distal end of the ejector barrel 126. When it is desired to dispose of the pipette tip, the operator presses down on the ejector rod 18 with the thumb of the hand holding the pipette 10. This causes the ejector rod 18 and the ejector barrel 66 to move distally and push the pipette tip off of the distal end of the barrel housing 42.

The transducer assembly 20 allows the electronics assembly 40 to determine the angular position of the volume delivery adjustment mechanism, and thus the fluid volume delivery setting of the pipette 10. The transducer assembly generates signals from preferably two Hall-effect sensors 122 and 124 which are oriented 90° away from each other. These sensors 122 and 124 are positioned equidistant from the perimeter of annular magnet 116. As the annular magnet 116 rotates, its magnetic field also rotates. This results in the two sensors 122 and 124 generating nearly sinusoidal outputs that differ in phase by 90°. This phase difference allows the electronics assembly 40 to determine the position of the volume delivery adjustment mechanism and thus the fluid volume delivery setting of the pipette.

The preferred Hall-effect sensors 122 and 124 are relatively high impedance surface mount, linear sensors. A sensor of this type which is preferable for use with the present invention is manufactured by Toshiba as THS129. However, this is one of many sensors known to those skilled in the art that could be used in the present invention, Each sensor 122 and 124 are surface mounted on boards 156 and 158 respectively, and each includes an amplifier such as is common in the art. A differential amplifier suitable for use with the present invention is manufactured by Analog Devices as AD626. Again however, this is only one of many similar devices known to those skilled in the art that could be used with the present invention. These amplifiers are single supply, low voltage and low power amplifiers.

The output of the transducer assembly 20 is directly proportional to the magnetic field that is applied to the Hall-effect sensors 122 and 124. The sensitivity of the Hall-effect sensors 122 and 124 is controlled by fixed resistors (not shown) which are common in the art. The fixed control resistors for each of the sensors 122 and 124 selected based on the physical dimensions of the transducer assembly 20 and the distance between the annular magnet 116 and the sensors 122 and 124 after assembled in the pipette 10. The value of the resistors was influenced by the sensitivity thereof to the applied magnetic field, the insensitivity thereof to external magnetic fields, and the required dynamic range for the output signals from the sensors 122 and 124, as is understood in the art. Further, the resistors were optimized according to the desired amount of overlap between the signals from the sensors 122 and 124. In order to minimize signal errors, the dynamic range of each sensor is maximized within the limits of the desired signal overlap.

The annular magnet 116 is formed of an injection molded plastic body having magnetic media suspended within the plastic. During manufacture of the annular magnet 116, while the plastic thereof is in a molten state, the magnetic media is oriented diametrically across the diameter of the plastic body and is magnetized preferably to approximately 400 Gauss. By orienting and magnetizing the annular magnet 116 across its diameter, the annular magnetic 116 generates a field similar to a bar magnet.

When the annular magnet 116 is rotated, the sensors 122 and 124 of the transducer assembly sense the changes in the magnetic field, and their outputs change proportionally with the changing magnetic field. As the south pole of the annular magnet 116 approaches the sensors 122 and 124, the output thereof grows in a positive direction. As the north pole of the annular magnet 116 approaches the sensors 122 and 124, the output thereof grows in a negative direction. This increase and decrease in output yields a nearly sinusoidal output signal from each of the sensors 122 and 124.

Figure 10:
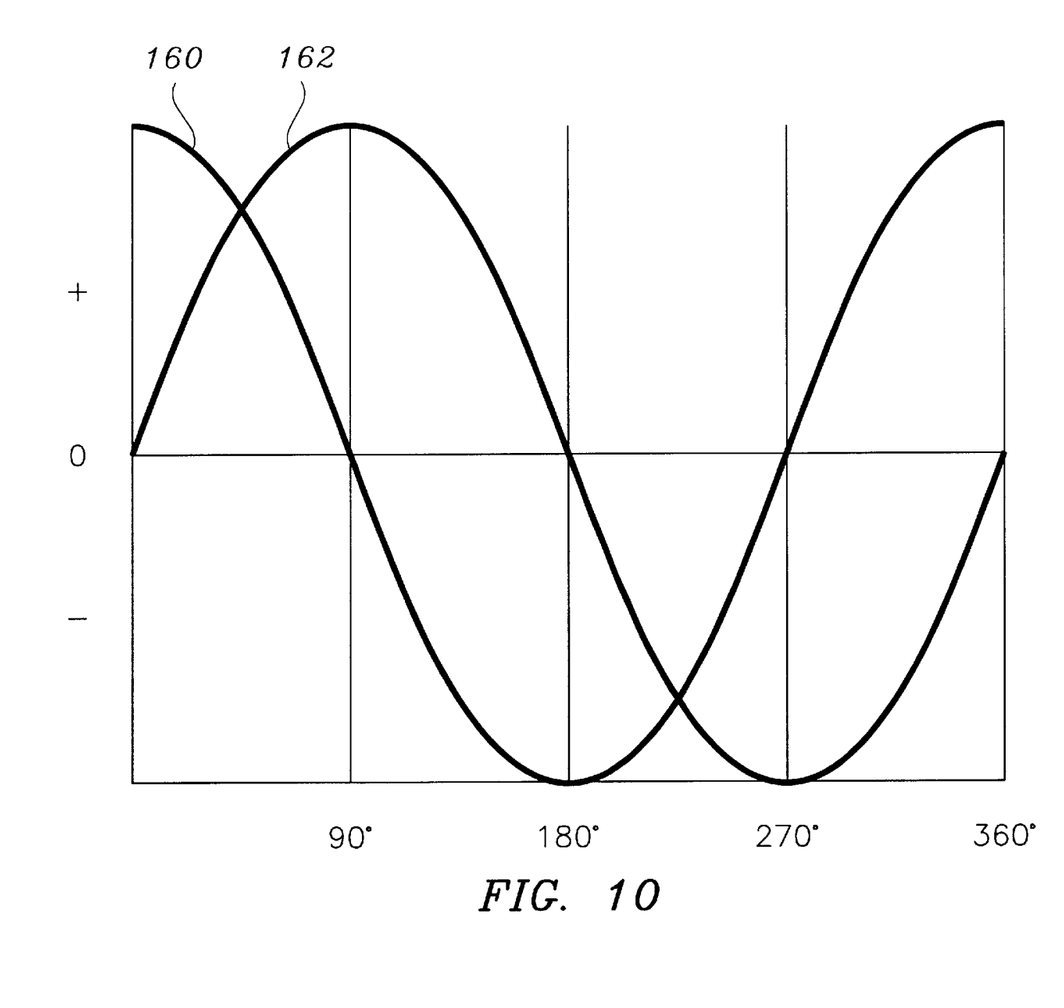
FIG. 10 is a graph of outputs of two Hall-effect sensors of a transducer assembly made in accordance with the principals of the present invention.

The phase relationship of the sinusoidal signals from the sensors 122 and 124 make it possible to determine the exact rotational position of the volume delivery adjustment mechanism. The position is determined by the electronics assembly 40 based on the current signal levels it is receiving from each sensor 122 and 124. Referring to FIG. 10, the transducer signals 160 and 162 from sensors 122 and 124 respectively are shown for one complete rotation of the volume delivery adjustment mechanism of the pipette 10. The graph is marked in increments of 90° rotation to form four 90° quadrants. Each 90° quadrant marking is placed such that one of the signals 160 or 162 is changing from positive to negative and the other signal 160 or 162 is remaining either in its positive or negative state as it passes the quadrant line.

The sine-cosine combination of signals 160 and 162 provides several important advantages in monitoring the position of the volume delivery adjustment mechanism. First, the resolution of each signal 160 and 162 varies significantly relative to the phase of the sinusoidal wave form. For example, the angular resolution of signal 160 is very good at or near the 0° and 180° positions where the signal 160 varies quickly with small changes in rotational position of the volume delivery adjustment mechanism. However, at the 90° and 270° positions, signal 160 no longer changes significantly with the angular rotation of the volume delivery adjustment mechanism. Fortunately, since the signal 162 is 90° out of phase from signal 160, its optimum resolution for detecting rotation of the volume delivery adjustment mechanism occurs at the precise positions where the signal 160 resolution is poor.

Another advantage of the sine-cosine combination of signals 160 and 162 is the ability to determine direction of rotation of the volume delivery adjustment mechanism based on the relative change of signal values from signals 160 and 162. This features also makes it very simple for the electronics assembly 40 to identify and tally all rotations of the volume delivery adjustment mechanism.

An added, and possibly most important advantage of the sine-cosine combination is the ability to discern the difference between a volume delivery adjustment mechanism position in the first 180° of revolution, and the second 180° of a revolution. With only a single sinusoidal signal, the repeating waveform would be indistinguishable between a first half and a second half of a full rotation of the volume delivery adjustment mechanism. This is because the sine function is equal at corresponding points between the first and second half of a whole rotation. However, the addition of the second signal allows comparison thereof with the first signal and allows easy identification of the position of the volume delivery adjustment mechanism in not only each half, but even in each quadrant of its rotation.

Referring again to FIG. 10, it can be seen that in the first quadrant of rotation of the volume delivery adjustment mechanism, between 0° and 90°, signal 160 is positive and decreasing while signal 162 is positive and increasing. However, at the 90° position, signal 160 becomes negative, so that the second quadrant, from 90° to 180°, is identifiable by the electronics assembly 40 as being the quadrant in which signal 160 is negative and signal 162 is positive. Similarly, the third quadrant, from 180° to 270° is the only quadrant in which both signals 160 and 162 are negative. Finally, the fourth quadrant, from 270° to 360° contains a positive signal 160 and a negative signal 162.

At any chosen angular rotational position of the volume delivery adjustment mechanism, signals 160 and 162 present a unique combination of signal values to the electronics assembly 40.

The annular magnet 116, which rotates with the volume delivery adjustment mechanism, is the key variable in determining the volume delivery adjustment setting of the pipette. The three major components which are essential for volume delivery setting determination are the first, relative position within a revolution of the volume delivery adjustment mechanism, second, the zero volume position from which the electronics assembly is calibrated to recognize the beginning point of the first revolution of the volume delivery adjustment mechanism, and third, the number of revolutions which have occurred from that zero position. With these three parameters, the electronics assembly 40 can compute the absolute position of the volume delivery adjustment mechanism, meaning the position in total number of revolutions plus the position in number of rotational degrees in the last revolution, from the zero position.

The manner in which the pipette 10 of the present invention determines the zero position of the volume delivery adjustment mechanism, and the manner in which the absolute position is calculated to determine the fluid volume delivery setting of the pipette 10, including calibration thereof, is included in the above-referenced co-pending U.S. patent application Ser. No. 08/926,371.

Operation

The pipette 10 of the present invention operates as follows. The operator, using the thumb of the hand holding the pipette 10, presses down on button 72 until the small bushing 78 on the distal end of the plunger 26 touches the primary washer 61. This motion is resisted by the primary spring 32 through the piston adaptor 34. This motion also brings the piston 28 downwardly along the fluid chamber 36. The operator then inserts the distal end of the pipette 10 (with a disposable pipette mounted thereon) into a fluid to be pipetted. The operator releases the button 72 and the primary spring 32 returns to its fully upwardly extended, positions, and draws piston 28 in a proximal direction, causing the fluid chamber 36 to be filled with fluid. The operator then inserts the distal end of the pipette 10 into the container to receive the fluid and again forces button 72 downwardly with the thumb until the small bushing 78 touches the primary washer 61. The user continues downward force on the button 72 causes the primary washer 61 to also move downwardly against the force of the secondary spring 60 until it is completely compressed. At this point, the preset volume of fluid has been delivered from the fluid channel 36.

If the operator desires to change the fluid volume delivery setting, the operator rotates button 72 either clockwise to reduce the volume delivery setting, or counterclockwise to increase the volume delivery setting. Rotation of button 72 causes rotation of bobber guide 82, threaded advancer 74, transducer drive 76, transducer bearing 130, and the annular magnet 116. Rotation of the thread advancer 74 (by rotation of button 72) causes the threaded advancer 74 to rotate through the threads 140 on the inside of the bushing 70 and thereby move in a longitudinal direction. This longitudinal movement also forces longitudinal movement of the plunger 26 and the transducer driver 76.

Rotational motion of the bobber guide 82, causes the bobber 80 to be forced downwardly in the distal direction against the bobber spring 88 until the bobber switch 84 contacts the stationary switch pad 98. Since the bobber 80 is keyed to the housing 12, and therefore cannot rotate, it moves downward to allow the meshing teeth 148 of the bobber guide 82 to pass over the meshing teeth 146 of the bobber 80. The individual teeth of the meshing teeth 146 and 148 are preferably sized to cause the bobber 80 to "bob" approximately every 6° of rotation. Each time the bobber is forced downwardly due to rotation of the bobber guide 82, the bobber switch 84 is forced into contact with the stationary switch pad 98. The bobber spring 88 then forces the bobber 80 upwardly again against the bobber guide 82. When the bobber 80 is again in its upwardmost position, the bobber switch 84 is again spaced away from the stationary switch pad 98. The contact of bobber switch 84 with the stationary switch pad 98 sends an interrupt signal to the microprocessor 110 which it recognizes as a signal to power up the sensors 122 and 124 in the transducer assembly 20. A more detailed discussion of the microswitch assembly 50, including alternative embodiments thereof, is included in applicant's co-pending U.S. patent application Ser. No. 08/927,375 entitled "Electronically Monitored Mechanical Pipette" filed Sep. 9, 1997, which is incorporated herein by reference in its entirety.

As the annular magnet 116 rotates, the magnetic field thereof passes through the sensors 122 and 124. The sensors 122 and 124 produce a current output based on the changing magnetic field passing therethrough which is sent to the microprocessor 110 through leads 134 and 136. The microprocessor computes a new volume delivery setting based on the signals it receives from the sensors 122 and 124 and displays the new volume setting in display 112. The operational features of the transducer assembly 20 and electronics assembly 40 are more completely described in applicant's co-pending U.S. application Ser. No. 08/927,375 identified above.

When the operator stops turning the knob 72, the bobber 80 is again biased to its upward proximal position by the bobber spring 88, and the bobber switch 84 is separated from the stationary switch pad 98. After a short period of time, preferably approximately 100 milliseconds after receiving its last interrupt signal, the microprocessor 110 turns off the power to the transducer assembly 20. The display 112 however remains powered, and continuously displays the current fluid delivery setting. In this manner, when the pipette 10 is not activated to change a fluid delivery setting, the power consumption thereof is limited to the power required to maintain the current fluid delivery setting displayed on the display 112 (approximately 10 microamps). The high power requirements of the transducer assembly 20 (approximately 17.0 milliamps) are only being consumed therefor when the pipette 10 is actually being operated to change its fluid volume delivery setting.

It will be apparent from the foregoing that, while a particular embodiment of the invention has been illustrated and described, various modifications can be made thereto without departing from the spirit and scope of the invention. Accordingly, it is not intended that the invention be limited, except as by the appended claims.

We claim:

1. A pipette for delivering a predetermined volume of fluid therefrom, said pipette comprising:

a volume delivery adjustment mechanism, a transducer assembly for producing at least two transducer signals related to the rotational motion of at least a portion of said volume delivery adjustment mechanism relative to said pipette, an electronics assembly capable of comparing said at least two transducer signals in order to compute and display a fluid volume delivery setting.

2. A pipette according to claim 1 wherein said at least two transducer signals are generated by at least two Hall-effect sensors disposed in a fixed angular relation to each other.

3. A pipette according to claim 2 wherein said at least two Hall-effect sensors are positioned in said transducer assembly 90 rotational degrees from each other.

4. A pipette according to claim 1 wherein said transducer assembly includes an annular magnet which is fixed for rotation with said volume delivery adjustment mechanism, said annular magnet having a diametrically oriented magnetic field.

5. A pipette according to claim 1 wherein said at least two transducer signals include at least two sinusoidal signals which are 90° out of phase from each other.

6. A pipette according to claim 1 wherein said transducer signals also relate to the direction of rotational motion of said at least a portion of said volume delivery adjustment mechanism relative to said pipette.

* * * * *